United States Patent [19]

Ramachandran

[11] 4,344,992
[45] Aug. 17, 1982

[54] PROCESS FOR PRODUCING ORGANO-SILANE COATED ASBESTOS BASE MATERIAL

[75] Inventor: Sundaresan Ramachandran, North Tonawanda, N.Y.

[73] Assignee: Union Carbide Corporation, Danbury, Conn.

[21] Appl. No.: 278,963

[22] Filed: Jun. 30, 1981

[51] Int. Cl.$^3$ .......................... C07F 7/10; C09K 7/00; B05D 1/18; B32B 9/00
[52] U.S. Cl. .............................. 427/430.1; 252/8.5 C; 428/378; 428/391; 556/410; 556/442; 556/445; 556/482
[58] Field of Search ..................... 252/8.5 C; 427/384, 427/387, 393.6, 430.1; 428/443, 447, 378, 391; 556/410, 442, 445, 482

[56] References Cited

U.S. PATENT DOCUMENTS 4,183,814 1/1980 Ramachandran .................... 252/8.5

FOREIGN PATENT DOCUMENTS 2546061 9/1976 Fed. Rep. of Germany .

*Primary Examiner*—Michael R. Lusignan
*Attorney, Agent, or Firm*—John R. Doherty

[57] ABSTRACT

A chrysotile asbestos base material is mixed in water containing dissolved alum (aluminum sulphate) prior to addition of the organo-silane coating.

2 Claims, No Drawings

PROCESS FOR PRODUCING ORGANO-SILANE COATED ASBESTOS BASE MATERIAL

The present invention relates to an improved process for producing organo-silane coated asbestos base material.

Chrysotile asbestos, as it naturally occurs, may be generally defined as a hydrous magnesium hydroxide. In contact with polar liquids, asbestos exhibits a strong positive charge and thereby attracts anions and thus can be used in removal of detergents from liquids; asbestos, in the natural state, is also highly effective as a flocculating agent for minerals such as titanium dioxide and clays. It has been proposed in German Patent Publication No. 2,546,061 to provide asbestos, and other minerals, with an organo-silane coating by first acid leaching the mineral to remove the outer octahedral layer, under controlled conditions, and thereafter react the leached mineral with an organo-silane. The organo-silane coated material is described as being desirable as an additive in oil well drilling muds and as a gelling agent and reinforcing agent in resins. However, the controlled acid leaching technique described in the German Patent Publication must be carefully practiced in order to avoid excessive removal of asbestos material and present industrial needs require further improvement in the rheological properties of fluids such as oil base drilling muds.

In U.S. Pat. No. 4,183,814 issued to S. Ramachandran on Jan. 15, 1980, there is disclosed and claimed an improved chrysotile asbestos base material having a precipitation deposited siliceous layer and an organo-silane coating bonded to and overlying the siliceous ayer. In producing this asbestos base material, the siliceous layer may be formed by adding a solution of a material capable of precipitating silica to an aqueous slurry containing open particulate chrysotile asbestos followed by neutralizing the slurry with acetic acid or the like to obtain a pH of about 9.5 or less. The silica precipitates under the conditions and adheres to and coats the asbestos. The organo-silane is then added to the slurry under controlled conditions to produce the organo-silane coating. Although organo-silane coated asbestos base material prepared in this manner is highly effective for improving the rheological properties of various non-aqueous fluids used in such applications as oil and gas drilling, reinforcing polyolefins and the like, there is still a need for an improved process for producing such asbestos base material which is less tedious and more economical.

It is therefore the primary object of the present invention to provide such an improved process for producing organo-silane coated asbestos base material.

Other objects and adavantages will become apparent from the following descriptions and claims.

An asbestos base material is prepared in accordance with the present invention by contacting an open chrysotile asbestos with a soluble di or trivalent metallic salt such as alum (aluminum sulphate) in an aqueous medium prior to addition of the organo-silane coating. The asbestos base material so prepared in this manner is characterized in that the organo-silane coating is bonded or fixed directly to the outer octahedral (magnesia) layer without leaching the same or providing a siliceous layer according to methods of the prior art. While the exact mechanism is not altogether clearly understood, it is believed that the alum or similar metallic salt acts as a catalyst to provide numerous catalytic sites on the asbestos outer layer for direct coupling of the organo-silane material.

In the practice of the present invention, an open chrysotile asbestos is thoroughly mixed in an aqueous slurry containing dissolved alum (aluminum sulphate) followed by the addition of organo-silane. The slurry, after mixing, is filtered and the solid treated asbestos is recovered by conventional methods. This process is very simple, effective and economical.

In addition to the alum (aluminum sulphate), it is believed that other similar soluble di and trivalent metallic salts can be used in the practice of the present invention. Suitable soluble salts may include, for example, iron sulphate, potassium ammonium sulfate and ferrous ammonium sulfate.

The quantity of alum or similar salt used in the aqueous slurry containing the asbestos is not too narrowly critical. However, it has been found in the particular case where the organo-silane coated asbestos base material is used to enhance the rheological properties of fluids such as oil drilling muds, the aqueous slurry should contain alum in amounts greater than about 5% by weight. The use of alum in amounts greater than about 20% by weight should be avoided since the greater quantities of alum may tend to decrease the pH of the slurry below about 3 which is disadvantageous to the organo-silane coating process.

Further, in the practice of the present invention, the alum or similar salt can be first dissolved in water prior to addition of the asbestos. Alternatively, the alum can be added as a solid to an asbestos slurry or as a solution. Also, the asbestos slurry can be treated at varying solid content of between about 1% and 8%.

The properties of the organo-silane coated asbestos base material of the present invention are influenced by the particular organo-silane employed. For example, octyl triethoxy silane provides an oleophilic coating which has a positive interaction with oil base fluids, such as drilling muds, and improves the rheological properties of these fluids as hereinafter described. The organo-silane used in the practice of the present invention is substantially as described in the above-noted German Patent Publication and is characterized by one of the two following structures:

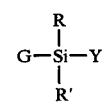

STRUCTURE I where G is a hydroxyl group or a group hydroxyzable to hydroxyl such as, for example, alkoxy or halogen; Y is an alkyl group containing from 1 to 20 carbon atoms, a phenyl group, an alkyl substituted phenyl group where the alkyl groups can contain a total of from 1 to 12 carbon atoms or a polyoxyalkylene radical having up to 25 carbon atoms, bonded to the silicon atom by a silicon to carbon bond, R and R' are selected from the group described by G and Y or hydrogen, or;

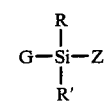

STRUCTURE II where G is a hydroxyl group or a group hydroxyzable to a hydroxyl such as, for example, alkoxy or halogen; Z is an alkyl group containing from 1 to 20 carbon atoms bearing a functional group such as, for example, amino, oxirane, mercapto or acryloxy; R and R' are selected from the groups described by G and Z, hydrogen, an alkyl group containing from 1 to 20 carbonm atoms, phenyl or alkyl substituted phenyl where the alkyl groups can contain a total of from 1 to 12 carbon atoms.

In a preferred embodiment of the present invention, the octyl triethoxy silane is added to the slurry containing the treated asbestos in quantities ranging from about 4 to 8% by weight of asbestos and then mixed uniformly for about 5 to 10 minutes. The treated solids are filtered using known techniques and then dried at about 110° C. for 2 to 3 hours.

The process of the present invention is applicable to the treatment of chrysotile asbestos obtained from many different natural sources. In particular, the chrysotile asbestos used herein for experimental purposes is a short fiber asbestos from the Coalinga, California, deposit, obtained from Union Carbide Corporation and marketed under the tradename Supervisbestos (Montello Inc.). The properties of this asbestos grade are shown in Table A.

TABLE A

| Specific Surface Area | m²/gm | 55–60 |
|---|---|---|
| Magnetite Content | percent | 1.0–1.7 |
| Reflectance | " | 68–70 |

Specific surface area is calculated from adsorption data using the BET (Brunauer, Emmet, Teller) method as described in Brunauer, "The Adsorption of Gases and Vapors", Princeton University Press (1945).

Magnetite content is measured by permeametric device patterned after ASTM standard method D-1118-57. However, because of the lower limit of detection of the ASTM device is only about 0.20% magnetite, the ASTM metnod has been improved with respect to sensitivity to measure a limit of detection of 0.005% magnetite, and the range extended to measure 0.10% magnetite in the mid-scale of the instrument. In order to obtain this greater range and improved sensitivity, the ASTM method has been modified to detect the phase changes of the current generated when magnetic materials are placed in a transformer core rather than the voltage changes generated.

Reflectance is measured on a sample prepared according to TAPPI (Technical Association of the Pulp and Paper Industry) standard T-452-m-58 and reported as percent of ultimate reflectance based on magnesium oxide as 100% reflectance.

A number of tests were conducted in order to demonstrate the effectiveness of the present invention. For example, in one series of tests, 2.5 grams of alum (i.e. 10% by weight of asbestos) were added to 2500 ml of water and the mixture was then thoroughly stirred until the alum was completely dissolved. This mixture containing the dissolved alum was then placed in a large Waring Blender together with 25 grams of short fiber chrysotile asbestos of the type described previously. The blender was operating at high speed for about 3 minutes in order to open the asbestos. The slurry so prepared was then poured into a two gallon pail and its pH was determined to be about 5.1. Approximately 6% or 1.5 grams of the octyl triethoxy silane were added to the slurry and stirred at a moderate rate for abut 10 minutes. The pH of the slurry after addition of the silane was about 5.2. The slurry was then filtered and dried for about 2 hours at 110° C. The pH of the filtrate was 5.3.

Similar organo-silane coated asbestos materials were prepared in the same manner using varying amounts of alum, i.e. 5, 8, 10, and 20% by weight of asbestos.

The dry, filtered organo-silane coated asbestos materials prepared in the above test were then employed as an additive in a standard oil base fluid (drilling mud) having the following composition:

332.5 ml of No. 2 Diesel Oil 17.5 ml of Water

The actual amount of additive was 14 lb/bbl.

The testing procedure for viscosity evaluation of the drilling mud was as follows:

The oil and water were mixed at high speed in a Waring Blender (Model No. 91-264) for two minutes prior to the addition of the prepared asbestos base material. Following the addition, stirring was continued in the blender, also at high speed, for ten minutes, after which time, the sample was removed to a Fann Viscometer (Model No. 35A), cooled to 115° F. (46° C.) and the viscosity and gel strength determined using standard procedure (i.e. American Petroleum Institute Publication No. API RP 13 B, 4th Edition, November 1972). The results are as shown in Table I below.

TABLE I

FANN OIL-MUD VISCOSITY-ALUM. SILANE TREATED ASBESTOS AT 14 lb/Bbl LOADING

| Sample No. | Alum % | Apparent Viscosity | 10/10 Gel Strength |
|---|---|---|---|
| 1 | 10 | 41.0 | 28 |
| 2 | 10 | 45.5 | 32 |
| 3 | 20 | 46.0 | 33 |
| 4 | 10 | 49.0 | 37 |
| 5 | 5 | 20.0 | 16 |
| 6 | 10 | 36.5 | 28 |
| 7 | 8 | 39.5 | 29 |

It will be seen from the results of Table I that the organo-silane coated asbestos material of the present invention is highly effective in enhancing the rheological properties of fluids such as drilling muds and the like. The range of apparent viscosity shown in Table I above is representative of present day industrial needs in oil well drilling fluids. It will be noted in particular that the apparent viscosity of the drilling oil is maintained in the range of from about 36 to 46 cps with addition of from about 8 to 20% alum at a loading of 14 lbs/bbl. It will be further noted that when the percent of alum is reduced to about 5% there is a significant reduction in the apparent viscosity to about 20 centipoise.

Drilling fluids to which material of the present invention can be added are oil base fluids, usually diesel oil, and water base fluids such as described in "Fluid Control" 12th Ed. Subcommittee of API published by Petroleum Extension Service, University of Texas at Austin (1969) and 37 Composition and Properties of Oil Drilling Fluids" W. F. Rogers, 3rd Ed (1963)--Gulf Publishing Co., Houston, Texas. For water base fluids a hydrophillic organo-silane coating is provided on the additive material, e.g., using a polyoxyalkylene substituted hydrolyzable silane such as $$CH_3O(C_2H_4O)_{7.5}C_3H_6Si(OCH_3)_3.$$

What is claimed is:

1. A process for producing organo-silane coated asbestos base material which comprises:
   (i) contacting an open chrysotile asbestos with a soluble di or trivalent metallic salt in an aqueous medium,
   (ii) adding organo-silane to said aqueous medium to thereby provide an organo-silane coating on said asbestos material, and
   (iii) recovering the organo-silane coated asbestos base material from said aqueous medium.

2. A process according to claim 1 wherein said soluble di or trivalent metallic salt is selected from the group consisting of alum, iron sulphate, potassium ammonium sulfate and ferrous annonium sulphate.

* * * * *

UNITED STATES PATENT AND TRADEMARK OFFICE
CERTIFICATE OF CORRECTION

PATENT NO. : 4,344,992
DATED : August 17, 1982
INVENTOR(S) : Sundaresan Ramachandran It is certified that error appears in the above—identified patent and that said Letters Patent is hereby corrected as shown below:

Col. 1, line 34, word "ayer" should read "layer".

Col. 3, line 7 - word "carbonm" should read "carbon".

Signed and Sealed this

Twenty-first Day of December 1982

|SEAL|

Attest:

GERALD J. MOSSINGHOFF

Attesting Officer    Commissioner of Patents and Trademarks